March 30, 1948. W. H. BURRUSS 2,438,739
BAIT TANK
Filed May 21, 1945
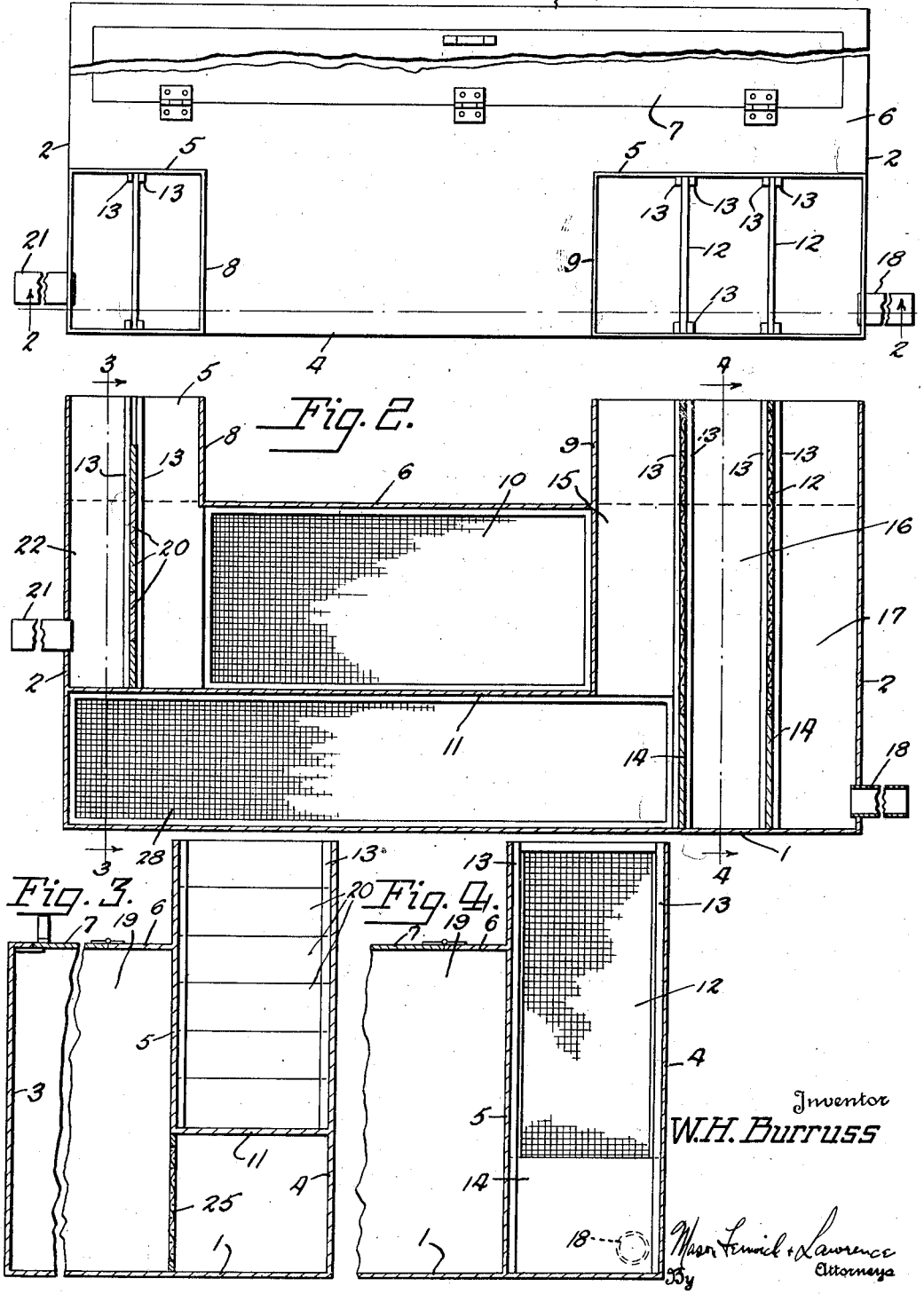
Inventor
W. H. Burruss Patented Mar. 30, 1948

2,438,739

UNITED STATES PATENT OFFICE 2,438,739

BAIT TANK

Walter Hart Burruss, Astoria, Oreg., assignor to Columbia River Packers Association, Inc., Astoria, Oreg.

Application May 21, 1945, Serial No. 594,920

6 Claims. (Cl. 43—56)

This invention relates to live bait boxes such as are commonly used in connection with various methods of fishing.

To keep the fish bait alive it is essential that the water in the bait box or tank be kept free of air and foreign substances. It is also essential that the water be circulated completely in the tank, but the circulation should be maintained with very low velocity to avoid injuring the bait.

The present invention is directed to an improved live bait box or tank structure in which the velocity of the water supplied to the tank or box is greatly reduced and free air and foreign particles removed in a most effective manner while the water is circulated in the bait compartment with a minimum of turbulence.

The object of the invention is to provide an improved bait box or tank with means for supplying water with a minimum amount of free air and foreign impurities and creating a complete circulation of the water in the bait compartment while maintaining the water in that compartment at a predetermined level.

Other objects will more particularly appear in the course of the following detailed description.

The invention consists in the novel construction, arrangement, and combinations of parts hereinafter more particularly described and claimed.

One sheet of drawings accompanies this specification as part thereof, in which like reference characters indicate like parts throughout.

Referring to the drawings:

Figure 1 is a plan view of a bait box embodying the present invention;

Figure 2 is a longitudinal vertical cross-section taken on line 2—2 of Figure 1;

Figure 3 is a transverse vertical cross-section taken on line 3—3 of Figure 2; and, Figure 4 is a fragmentary vertical cross-section taken on line 4—4 of Figure 2.

Referring to the drawings which illustrate somewhat diagrammatically a possible embodiment of the present invention, the tank is constructed as a substantially rectangular box having a bottom 1, end walls 2—2, a rear wall 3, a front wall 4 and a top 6.

A medial partition 5 extends longitudinally of the box dividing the same generally into a bait compartment 19 occupying the rear portion of the main tank and water supply and exhaust compartments positioned in the front portion of the tank.

To provide such intake and exhaust compartments transverse vertical walls 8 and 9 are positioned between the medial wall 5 and the front wall 4 and the top 6 is herein illustrated as extending forwardly between these transverse walls 8 and 9.

On the intake side of the tank herein illustrated, as on the right-hand side of Figure 2, slidable screen baffles 12 are provided extending transversely of the tank and between the medial wall 5 and the front wall 4, each of these screens 12 having an imperforate portion 14. Slide runners 13 can be arranged in pairs on the medial wall 5 and the front wall 4 between which the screens can slide vertically and be removed as desired for cleaning when necessary. These screen baffles 12, it will be noted, divide the right-hand compartment into three smaller compartments 15, 16 and 17 and the water supply pipe 18 communicates through the end wall 2 into the outermost supply compartment 17.

A horizontal false bottom 11 connects the left-hand end wall 2 with the bottom edge of the intermediate partition 9, providing below said false bottom a chamber 23 extending from the left-hand end wall and communicating with the bottom of the innermost supply chamber 15. Above the false bottom 11 is formed a compartment intermediate the medial wall 5 and the front wall 4 and extending from the intermediate wall 9 to the outlet compartment 22 defined by the left-hand end wall and the intermediate wall 8. Similar guide cleats 13 are positioned on opposite sides of the outlet compartment 22 to provide guideways for a plurality of transverse partition slats 20 which can be arranged in desired numbers to establish the desired water level in the bait compartment. An outlet pipe 21 communicates with the outer compartment formed by the baffles 20 in the outlet chamber 22.

The medial wall 5 is provided with a screened window 10 positioned intermediate the walls 8 and 9 and above the false bottom 11 and is further provided with a screened window 25 positioned beneath the false bottom 11 and extending the full length of said false bottom and to the innermost of the screen baffles 12 in inlet compartment 15.

A hinged door 7 can be provided for the top 6 giving access to the bait compartment 19.

In operation, the water is supplied to the bait tank through the pipe 18 and upon entering the intake compartment 17 impinges on the imperforate bottom portion 14 of the outermost screen baffle 12, thence rises and passes through the screened portion of that baffle into the medial compartment 16 where it again impinges on the innermost screen 12 through which it must pass at the upper screened levels into the innermost compartment 15, and thence descends to enter the bait compartment 19 through the screened window 25. In thus entering the bait compartment at the lowest levels, any remaining free air bubbles will tend to rise upwardly and will be forced into the exhaust compartment, through the flow of water outwardly from the bait compartment, through the screened window 10 above the false bottom 11. The exhaust water with any entrained air then passes into the exhaust compartment and impinges the baffles 20 being forced to rise and flow over the uppermost of said baffles and thence be drawn off through the outlet pipe 21.

It will be apparent that the velocity of the water entering through the pipe 18 is greatly reduced by reason of the screened compartments 15, 16 and 17 through which it is forced to pass, and still further reduced in both velocity and turbulence through the great area of the screened window 25 through which it enters the bait compartment. Similarly, the exhaust water passing through the large area of screened window 10 is calculated to produce very little turbulence or pressure against that screen, thus minimizing the injury of the live bait.

Various modifications will readily suggest themselves to those skilled in the art and depending upon the conditions under which the present invention is to be used, but all within the scope of the present invention as claimed.

What I claim is:

1. Live bait box comprising a bait compartment, an auxiliary water supply compartment, a screened passage from the bottom level of the supply compartment to the bait compartment, an auxiliary water exhaust compartment, and a screened passage from the upper level of the bait compartment to the exhaust compartment, the screened inlet passage to the bait compartment being positioned immediately below the screened outlet passage from the bait compartment.

2. Live bait box comprising a bait compartment, an auxiliary water inlet compartment, spaced screened baffles in the inlet compartment, a screened passage communicating the bottom level of the inlet compartment with the bottom level of the bait compartment, an auxiliary outlet compartment, a plurality of superposed baffles in the outlet compartment to determine the water level throughout the device, a screened passage communicating the upper level of the bait compartment with the upper level of the outlet compartment and inlet and discharge ports in the inlet and outlet compartments respectively.

3. Live bait tank comprising a bait compartment extending the length of the tank, inlet and outlet water compartments at each end of the tank with superposed conduits extending from said inlet and outlet compartments and communicating with the bait compartment, the conduit from the inlet compartment being positioned below the conduit from the outlet compartment.

4. Live bait tank as specified in claim 3 with spaced screen baffles in the inlet compartment.

5. Live bait tank as specified in claim 3 in which the bait compartment has superposed screened windows communicating respectively with the inlet and outlet water conduits, said screened windows extending the full length of said conduits.

6. Live bait tank as specified in claim 3 in which the bait compartment has superposed screened windows communicating respectively with the inlet and outlet water conduits, said screened windows extending the full length of said conduits, with spaced screen baffles in the inlet compartment and means in the outlet compartment for controlling the depth of water throughout the tank.

WALTER HART BURRUSS.

REFERENCES CITED

The following references are of record in the file of this patent:

UNITED STATES PATENTS

| Number | Name | Date |
|---|---|---|
| 680,838 | Bourgeois | Aug. 20, 1901 |
| 2,125,962 | Shoemaker | Aug. 9, 1938 |

FOREIGN PATENTS

| Number | Country | Date |
|---|---|---|
| 431,044 | Great Britain | June 28, 1935 |